F. L. VARS.
HOBBLE.
APPLICATION FILED MAY 18, 1915.
1,210,236.
Patented Dec. 26, 1916.
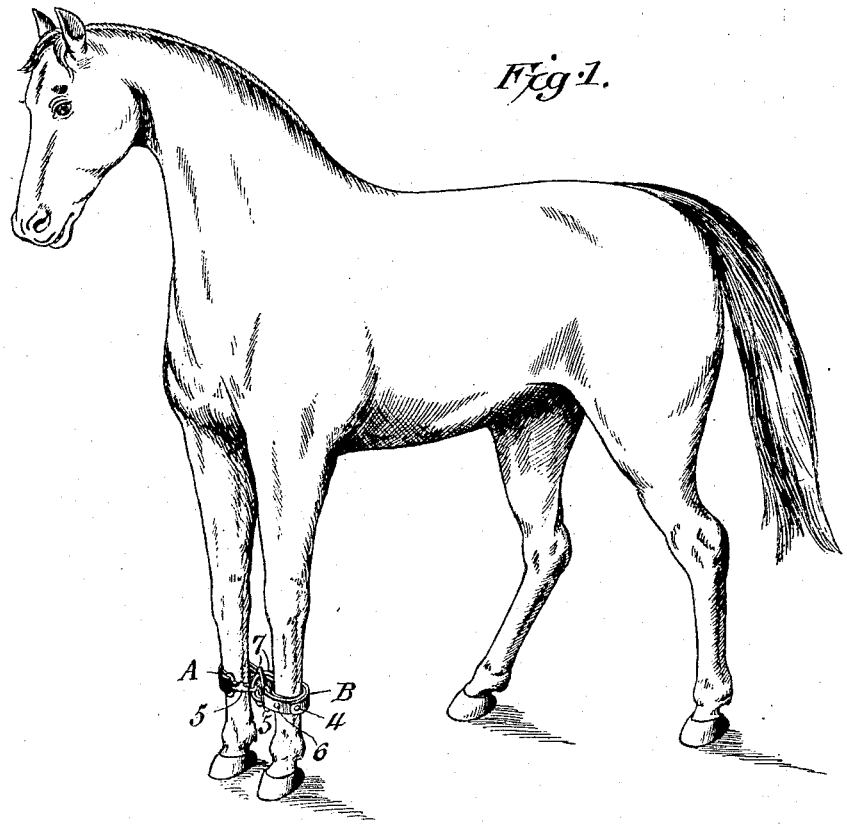
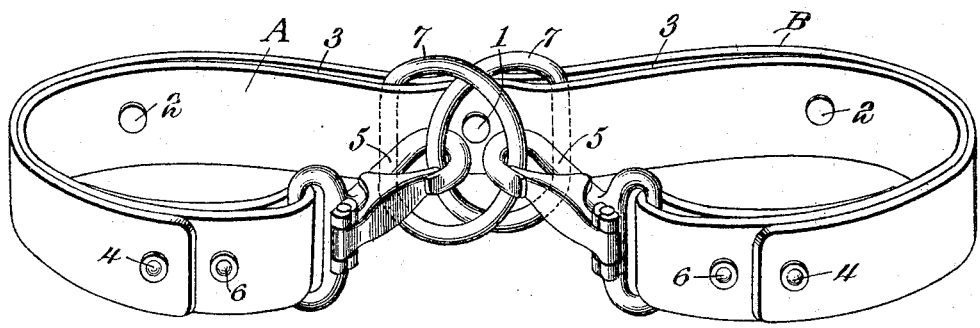
WITNESSES:
Howard D. Orr
Walts F. Estabrook
F. L. Vars, INVENTOR,
BY
Attorney

UNITED STATES PATENT OFFICE.

FOREST L. VARS, OF NILE, NEW YORK.

HOBBLE.

1,210,236.

Specification of Letters Patent.

Patented Dec. 26, 1916.

Application filed May 18, 1915. Serial No. 28,883.

*To all whom it may concern:*

Be it known that I, FOREST L. VARS, citizen of the United States, residing at Nile, in the county of Allegany and State of New York, have invented a new and useful Hobble, of which the following is a specification.

This invention relates to an improvement in hobbles, and the object is to provide a simple and inexpensive device which can be applied to the legs of animals for the purpose of hitching or confining the animal.

Another object of the invention is in the provision of loops in the main body for supporting rings which are capable of sliding movement. These rings are adapted to be engaged by snap hooks carried by the terminals of the hobble or band, whereby the hobble or band can be applied and fastened to the legs of an animal for restricting the movement of the animal.

The invention consists of certain novel features of construction and combination of parts, which will be hereinafter described and pointed out in the claims.

It is to be understood that many slight changes may be made in the form and arrangement of the several parts described without departing from the spirit and scope of the invention, and therefore I do not wish to be limited to the exact construction herein set forth.

In the drawings,—Figure 1 is a view in perspective of the invention applied to a horse. Fig. 2 is a perspective view of the hobble.

A represents the main strap or band and B is the auxiliary strap or band. The two straps A and B are connected together about midway of the main strap A by means of the rivet or other suitable means 1. The two straps or bands are connected together at a suitable distance from the central rivet 1 by means of rivets or other fastenings 2 for producing loops 3. The terminals of the two straps or bands are connected together by rivets or other means 4. Snap hooks 5 are connected to the terminals of the band A and each terminal of the band is bent on itself forming a loop and connected by a rivet 6 for confining the hooks.

Rings 7—7 of preferably D shape are inserted within the loops 3, and are capable of a sliding movement therein, each loop being provided with a ring, and each loop is preferably of a length say five inches to permit of the movement of the rings therein in obtaining various hitches.

In Fig. 2 the two rings 7 are shown crossed and each ring engaged by a snap hook 5. When the rings and hooks are connected in this manner the movement of the animal is restricted and such a hitch is generally used or applied to a horse when it is desired to hitch the horse and prevent him from moving off. Or, it may be applied to a cow to prevent kicking during milking or to a kicking animal when confined in the stall. If, however, it is desired to permit the animal to move about the pasture or meadow the rings 7 will not be crossed but each hook 5 will engage the ring adjacent thereto. Such a connection will give freedom of movement of the animal and yet will confine the animal within the pasture or restricted area.

If it is desired to hitch an animal so as to further confine the animal and cause the animal to travel on three legs, the strap is applied to the front leg below the fetlock and the hook is connected to the adjacent ring causing a closed hitch. The strap is then placed around the leg about the knee of the animal after raising the front leg, causing the other hook to engage the ring which has been previously engaged by the first mentioned hook.

From the foregoing it will be seen that I have provided a very simple device which can be applied in various ways to animals for confining the animal or restricting the movement of the legs of the animal.

The material from which the hobble is constructed may be of canvas, leather, or any other suitable material.

When the device is applied to bulls they may be allowed to roam at large without danger to man, or other objections.

What is claimed is—

1. A hobble comprising a band-like structure with snap hooks at the ends and formed with elongated loops extending oppositely from the middle of the hobble, and rings individual to and movable along the elongated loops, whereby either ring may be engaged by either snap hook, with the rings crossed when engaged by the snap hooks at the ends of the hobble.

2. A hobble comprising a two-ply band or strap with snap hooks at the ends, the two plies of the band or strap being connected at intervals to form elongated loops extending oppositely from the middle of the hobble, and rings engaged in and individual to and movable along the elongated loops, whereby either ring may be engaged by either snaphook, with the rings crossed when engaged by the snap hooks at the ends of the hobble.

3. A hobble comprising an elongated band or strap with snap hooks at the extremities, and with rings on opposite sides of a mid point and having a range of movement away from each other for a limited distance and also toward each other to permit the rings to be crossed with one entering the other, whereby the hobble may be formed into two large loops with the snap hooks engaging the rings when the latter are crossed or into two small loops with the snap hooks engaged in the rings on the same sides of the mid-point of the hobble as such snap hooks.

In testimony, that I claim the foregoing as my own, I have hereto affixed my signature in the presence of two witnesses.

FOREST L. VARS.

Witnesses:
N. ROBERTSON,
A. L. ELLIOTT.